W. G. FAIRBANK.
PASTRY CUTTING GUIDE.
APPLICATION FILED MAR. 19, 1918.
1,297,671.
Patented Mar. 18, 1919.
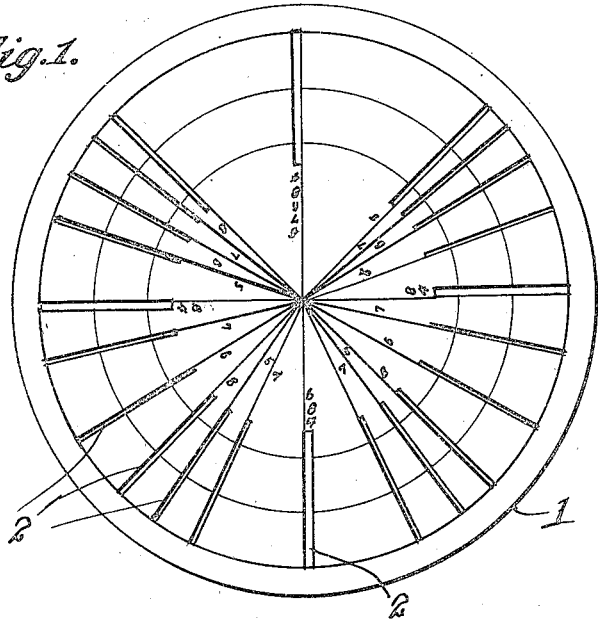
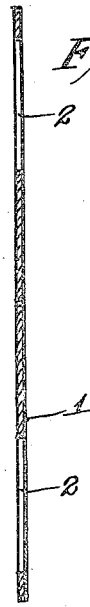
WITNESSES
James F. Crown,
Wm H. Milligan
INVENTOR
William G. Fairbank,
BY Richard Owen,
ATTORNEY

UNITED STATES PATENT OFFICE.

WILLIAM G. FAIRBANK, OF MIDDLETOWN, CONNECTICUT.

PASTRY-CUTTING GUIDE.

1,297,671.  Specification of Letters Patent.  Patented Mar. 18, 1919.

Application filed March 19, 1918. Serial No. 223,391.

*To all whom it may concern:*

Be it known that I, WILLIAM G. FAIRBANK, a citizen of the United States, residing at Middletown, in the county of Middlesex and State of Connecticut, have invented certain new and useful Improvements in Pastry-Cutting Guides, of which the following is a specification.

This invention relates to household utensils and more particularly to a pastry cutting guide adapted for use in properly cutting pastry such as pies and cakes of a circular form into equal sections.

The primary object of the invention is to provide a simple disk like structure which may be placed over the top of the pastry and which will be suitably slotted to permit a knife to be passed through certain selected slots, identified by suitable indicia, for marking the pastry after which the device may be removed so that the pastry could be cut by the knife into equal sections.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1 is a plan view of the device constructed in accordance with my invention.

Fig. 2 is a transverse section through the same.

Referring to the drawing, and particularly to Fig. 1 thereof, wherein is illustrated the preferred form of my invention, the disk 1 is constructed of any suitable material such as heavy waxed cardboard, glazed fiber, or aluminum. The disk is provided with a plurality of radial slots, 2 which are arranged systematically and which are spaced apart circumferentially at suitable distances whereby a knife may be inserted through certain of the slots to engage the surface of the pastry for marking the same at equally spaced intervals. The slots are identified with numerals marked upon the surface of the disk adjacent the slots. For instance, the four slots necessary for marking the pastry to cut the same into quarters, are identified by the numeral 4, thereby indicating to the user that the slot marked with the numeral 4 must be employed when the pastry is to be divided into quarters. The other slots are also suitably marked and it will be obvious that any number of slots may be provided all of which will be properly marked with the necessary numeral for the purpose of readily identifying the slot when the device is in use. A suitable opening is provided in the disk in order that the center of the pastry may be marked for facilitating the cutting thereof.

The cheapness, simplicity, and low cost of manufacture is one of the essential characteristics of the device and it will be readily apparent that the slots in the disk 1 may be readily cut from a number of the disks placed one upon another so that a plurality of the devices may be simultaneously formed with suitable cutting or punching mechanism.

From the foregoing it will be obvious that a very simple and durable device has been provided, the details of which embody the preferred form. I desire it to be understood, however, that slight changes may be made in the minor details of construction without departing from the spirit of the invention or scope of the claim hereunto appended.

I claim:

A device adapted for use in guiding a knife to cut circular pastry, comprising a circular disk having a central opening formed therein and provided with a plurality of radially extending slots terminating in close proximity to the marginal edge of the disk, and suitably circumferentially spaced apart to form equally spaced segmental divisions in the pastry when the knife is received in certain of the said slots, the said disk having its surface provided with indicia marked thereon to identify the said slots.

In testimony whereof I affix my signature in presence of two witnesses.

WILLIAM G. FAIRBANK.

Witnesses:
MARTHA E. FERRIGNO,
F. D. HAINES.